UNITED STATES PATENT OFFICE.

JESSE C. KING, OF MONTREAL, QUEBEC, CANADA.

ELECTRODE.

1,312,257.  Specification of Letters Patent.  Patented Aug. 5, 1919.

No Drawing.  Application filed October 9, 1917.  Serial No. 195,575.

*To all whom it may concern:*

Be it known that I, JESSE C. KING, a citizen of the United States, and resident of the city of Montreal, in the Province of Quebec and Dominion of Canada, have invented certain new and useful Improvements in Electrodes, of which the following is a full, clear, and exact description.

This invention relates to improvements in electrodes for use in electric furnaces and the like.

Electric arc electrodes are subject to considerable wasting away by burning under the action of air or other oxidizing gases. If the electrode is not protected by some means, the portion exposed to the air wastes away very rapidly.

One of the objects of my invention is to provide an electrode comprising a core of suitable carbonaceous material, having preferably a roughened surface, and a suitable protective coating bonded to the roughened surface of the core to protect same against disintegration.

A further object is to provide the electrode with a coating which will considerably increase the current carrying capacity above that of the normal carbon electrode.

In some furnaces, it is desirable to increase the current carrying capacity of the electrode, and to this end, I provide a coating of protective material containing a proportion of finely divided metal particles which not only increase the current carrying capacity, but further serve to bond and strengthen the protective covering for the core.

The main constituent of the electrode covering should be a non-oxidizing material, and I have found that such substances as fire-clay, graphite, silica, magnesite, zerconium, bauxite, or mixtures of same, when finely ground, are suitable for the purpose. To this non-oxidizing material I add metal particles in finely divided condition. It will of course be necessary to use a metal which will not contaminate the product to be produced in the furnace. The amount of metal mixed in the coating will depend upon the temperature in the furnace, so that the electrode will not disintegrate. Generally speaking, the proportion of metal may vary from five to twenty-five per cent. of the non-oxidizing material used, but even greater quantities of metal particles may be added, where furnace temperatures are comparatively low and where increased conductivity is desired.

I may also find it desirable to use a binder of pitch or other carbonaceous material to bind the particles of metal and non-oxidizing material thoroughly together, while the coating is being baked on to the core.

The coating may be applied to the electrode by molding it thereon, the electrode being used as a core in the mold, or the coating may be applied with a trowel or like implement.

Having thus described my invention, what I claim is:—

1. A coating for electrodes for electric furnaces, consisting of a mixture of finely ground non-oxidizing material and metal particles.

2. A coating for electrodes for electric furnaces consisting of a mixture of non-oxidizing material and approximately from five to twenty-five per cent. of metal particles.

3. An electrode for electric furnaces having a coating of non-oxidizing material and metal particles bonded or baked on to the surface.

4. An electrode for electric furnaces comprising a carbon core having a roughened surface, and a coating of non-oxidizing material and metal particles bonded or baked on to the roughened surface.

In witness whereof, I have hereunto set my hand.

JESSE C. KING.

Copies of this patent may be obtained for five cents each, by addressing the "Commissioner of Patents, Washington, D. C."